(12) United States Patent
Tan et al.

(10) Patent No.: US 9,360,310 B2
(45) Date of Patent: Jun. 7, 2016

(54) MULTI-SENSOR INDOOR LOCALIZATION METHOD AND DEVICE BASED ON LIGHT INTENSITY

(71) Applicant: SHENZHEN INSTITUTES OF ADVANCED TECHNOLOGY CHINESE ACADEMY OF SCIENCES, Guangdong (CN)

(72) Inventors: Guang Tan, Guangdong (CN); Bo Xie, Guangdong (CN); Chenghua Mao, Guangdong (CN)

(73) Assignee: Shenzhen Institute of Advanced Technology Chinese Academy of Sciences, Guangdong (CN)

( * ) Notice: Subject to any disclaimer, the term of this patent is extended or adjusted under 35 U.S.C. 154(b) by 459 days.

(21) Appl. No.: 14/087,162

(22) Filed: Nov. 22, 2013

(65) Prior Publication Data

US 2015/0039262 A1 Feb. 5, 2015

(30) Foreign Application Priority Data

Jul. 30, 2013 (CN) .......................... 2013 1 0325495

(51) Int. Cl.
| | |
|---|---|
| *G01B 21/00* | (2006.01) |
| *G01B 7/00* | (2006.01) |
| *G01B 11/00* | (2006.01) |
| *G01V 8/20* | (2006.01) |
| *G01S 5/16* | (2006.01) |

(52) U.S. Cl.
CPC ........ *G01B 21/00* (2013.01); *G01B 7/00* (2013.01); *G01B 11/00* (2013.01); *G01S 5/16* (2013.01); *G01V 8/20* (2013.01)

(58) Field of Classification Search
CPC ...................................................... G01B 21/00
USPC .......................................................... 702/150
See application file for complete search history.

(56) References Cited

U.S. PATENT DOCUMENTS

| | | | |
|---|---|---|---|
| 2005/0213082 A1* | 9/2005 | DiBernardo ............ | G01S 5/163 356/139.03 |
| 2005/0213109 A1* | 9/2005 | Schell ..................... | G01S 5/163 356/614 |
| 2010/0295733 A1* | 11/2010 | Luo ........................ | G01S 5/0263 342/451 |

* cited by examiner

*Primary Examiner* — Manuel L Barbee
*Assistant Examiner* — Raymond Nimox
(74) *Attorney, Agent, or Firm* — Rosenberg, Klein & Lee

(57) ABSTRACT

The present disclosure relates to a multi-sensor indoor localization method and device. The method includes: an optical signal is received from a point light source using an optical sensor group having N optical sensors; the light intensity of the optical signal is obtained, the optical sensor group includes a polyhedron-shaped base where the normal vectors of each three faces are linearly independent, the N optical sensors are located on the faces of the base, and N≥6; the current heading is obtained by a magnetic sensor group; a current unit normal vector is obtained; a system of at least three equations is established; the system of equations is solved to obtain an approximate solution of minimum residual, the approximate solution is regarded as the coordinates of the optical sensor group.

10 Claims, 4 Drawing Sheets

MULTI-SENSOR INDOOR LOCALIZATION METHOD AND DEVICE BASED ON LIGHT INTENSITY

FIELD OF THE INVENTION

The present disclosure relates to a localization technology, and more particularly relates to a multi-sensor indoor localization method and device based on light intensity.

BACKGROUND OF THE INVENTION

With the popularity of information and communication technology, there are increasing demands for indoor localization. Accurate location information is needed in public places such as shopping malls, airports, exhibition halls, office buildings, warehouses, underground parking, etc. Indoor localization can be used in guiding mall shopping, large warehouse management, public places tracing, etc. Accurate location information can be used to navigate police officers, firefighters, soldiers, and medical staff in specific places and help them fulfill specific indoor tasks. However, conventional localization systems cannot meet the demands of indoor location based services. The GPS works well outdoors, but in indoor environments, the walls and concrete obstacles can block the GPS signal, which makes localization very difficult.

Current indoor localization technologies mainly include proximity detection method, fingerprint matching method, multilateration/angulation method, etc. The proximity detection method takes the location of a detected signal source as the localization position. The disadvantage of this method is its low accuracy. The fingerprint matching method produces higher accuracy according to mapping of signal characteristics with a fingerprint database. But the localization result of this method can be affected by indoor multipath effects and environmental changes; moreover it is tedious to establish the fingerprint database. The multilateration/angulation method first measures the distance/angle between a device and a reference node by hardware equipments, and then locates the device from the geometric constraints defined by the distances/angles. Many practical devices do not possess such ranging or angle measuring capability, so the localization results are inaccurate.

SUMMARY OF THE INVENTION

The present disclosure is related to a multi-sensor indoor localization method and device based on light intensity, which addresses the problems mentioned above.

According to one aspect, a multi-sensor indoor localization method based on light intensity is provided. The method includes: receiving optical signal from a point light source that flashes at a specified rate by using a group of N optical sensors installed on a polyhedron-shaped base where the normal vectors of each three faces are linearly independent (e.g., a regular dodecahedron or a part of it); each sensor obtaining the light intensity of the optical signal by applying Fast Fourier Transformation (FFT) and reverse FFT techniques to the sensor readings; obtaining the current heading of the device by a magnetic sensor group; obtaining the current unit normal vector of each sensor face; establishing a system of at least three equations according to the sensor's unit normal vectors, the light intensities, the coordinates of the point light source and a light intensity model; solving the system of equations to obtain an approximate solution of minimum residual. The approximate solution is regarded as the coordinates of the optical sensor group and the device.

The equations are established according to the light intensity model $s_i = f_d(d) f_\mu(\mu_i) f_\omega(\omega)$, where $s_i$ is the light intensity computed by the $i^{th}$ optical sensor, d is the Euclidean distance between $(x_0, y_0, z_0)$, the coordinates of the point light source, and (x, y, z), the coordinates of the optical sensor group (or the receiving device); $f_d(d)$ is a function describing the relationship between light intensity and distance d, $f_\mu(\mu_i)$ and $f_\omega(\omega)$ are functions describing the relationships between light intensity and $\mu_i$, $\omega$ respectively. In addition, $\mu_i = \arcsin(|A_i(x_0-x)+B_i(y_0-y)+C_i(z_0-z)|/d)$, where $(A_i, B_i, C_i)$ is the current normal vector of the face of the $i^{th}$ optical sensor, and $\omega = \arccos((z_0-z)/d)$.

According to another aspect, a multi-sensor indoor localization device based on light intensity is provided. The device includes: an optical sensor group, a magnetic sensor group, a point light source, a data processing module, and a memory module. The optical sensor group includes N optical sensors, where N≥6. The optical sensor group is installed on a polyhedron-shaped base where the normal vectors of each three faces are linearly independent (e.g., a regular dodecahedron or a part of it), and the N optical sensors are located on the faces of the base. At least three optical sensors are operable to receive the optical signal from the point light source. The memory module is operable to store the coordinates of the point light source and the initial unit normal vectors of the N sensors' faces. The magnetic sensor group is operable to obtain a current heading angle. The data processing module is operable to obtain a light intensity according to the optical signal, obtain the current unit normal vector according to the heading angle and the initial unit normal vector, establish a system of equations comprising at least three equations according to the current unit normal vector, the light intensity, and the coordinates of the point light source, and solve the system of equations to obtain an approximate solution of minimum residual. The approximate solution is regarded as the coordinates of the optical sensor group. The equations are established according to the light intensity model $s_i = f_d(d) f_\mu(\mu_i) f_\omega(\omega)$, where $s_i$ is the light intensity computed by the $i^{th}$ optical sensor, d is the Euclidean distance between $(x_0, y_0, z_0)$, the coordinates of the point light source, and (x, y, z), the coordinates of the optical sensor group; $f_d(d)$ is a function describing the relationship between light intensity and distance d, $f_\mu(\mu_i)$ and $f_\omega(\omega)$ are functions describing the relationships between light intensity and $\mu_i$, $\omega$ respectively. In addition, $\mu_i = \arcsin(|A_i(x_0-x)+B_i(y_0-y)+C_i(z_0-z)|/d)$, where $(A_i, B_i, C_i)$ is the current normal vector of the face of the $i^{th}$ optical sensor, and $\omega = \arccos((z_0-z)/d)$.

The multi-sensor indoor localization method according to the present disclosure measures the light intensity of a point light source using a receiving device equipped with a number of optical sensors. It then uses a light intensity model to solve for the location of the receiving device without the help of other high auxiliary equipments or signal fingerprint collection. The method above has a high localization precision, good stability and low cost.

DETAILED DESCRIPTION OF THE EMBODIMENTS

For purposes of the present invention, the technical solutions and advantages are more clearly understood with the accompanying drawings and the following embodiments. The present invention will be described in further detail. It should be understood that the specific embodiment described herein are merely examples to illustrate the invention, not to limit the present invention.

The present disclosure provides a multi-sensor indoor localization device and method based on light intensity.

Figure 1:
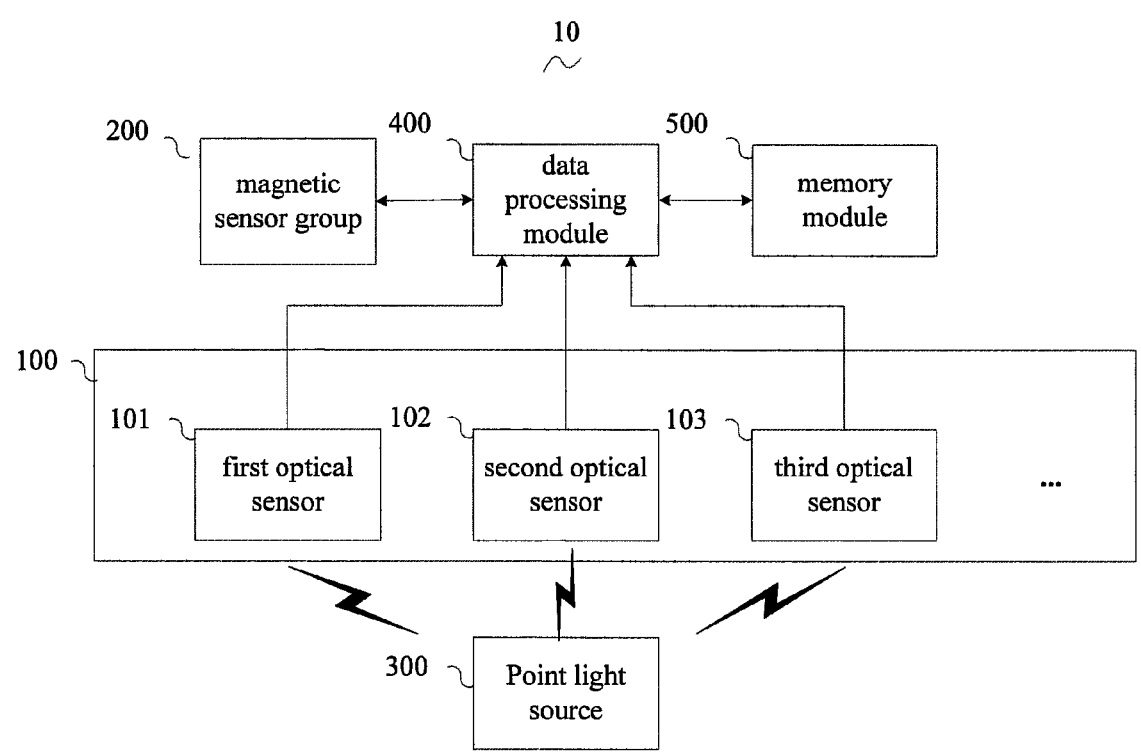
FIG. 1 is a block diagram of a multi-sensor indoor localization device based on light intensity according to one embodiment.

Referring to FIG. 1, an embodiment of a multi-sensor indoor localization device 10 based on light intensity includes an optical sensor group 100, a magnetic sensor group 200, a point light source 300, a data processing module 400, and a memory module 500.

The optical sensor group 100 includes a polyhedron-shaped base 110 and N optical sensors (i.e. a first sensor 101, a second sensor 102, a third sensor 103, etc.), where N≥6. The normal vectors of each three faces of the polyhedron-shaped base 110 are linearly independent. The N optical sensors are located on the faces of the base 110. The optical sensor group 100 should satisfy the following conditions: when the optical sensor group 100 is placed horizontally in a room, at least three optical sensors can receive the optical signal from the point light source 300.

Figure 2:
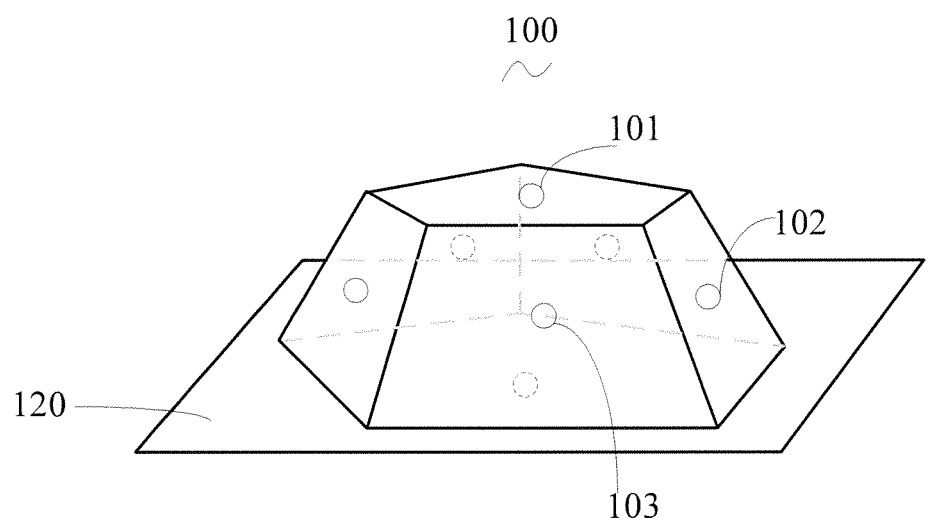
FIG. 2 is a schematic view of an optical sensor group according to one embodiment.

Taking N=6 as an example, referring to FIG. 2, the base 110 has a shape of a five-sided prismoid. The optical sensor group 100 has six optical sensors, which are located on the six faces of the base 110. According to the design mentioned above, at least three optical sensors (e.g. the first sensor 101, the second sensor 102, and the third sensor 103) of the optical sensor group 100 can receive the optical signal from the point light source 300.

The first sensor 101, the second sensor 102, and the third sensor 103 collect the optical signal of the point light source 300. The data processing module 400 can obtain the light intensity according to the optical signal.

In the illustrated embodiment, the optical sensor group 100 is disposed on a circuit board 120, and the optical sensors and the data processing module 400 can be connected through the data interfaces of the circuit board 120. The data processing module 400 can be but not limited to devices having data processing functions, such as a CPU, an embedded processing chip, etc. The optical sensor group 100, the data processing module 400, and the memory module 500 can be integrated on a circuit board which is to be located, thus they can be moved with the circuit board.

The magnetic sensor group 200 is configured to obtain a current heading angle $\Phi$ of the moving circuit board which is to be located. The data processing module 400 obtains the current unit normal vector (A, B, C) according to the heading angle $\Phi$ and an initial unit normal vector. Preferably, the magnetic sensor group 200 includes M magnetic sensors, the M magnetic sensors are arranged to form a circle. In the illustrated embodiment, M=6, the magnetic sensor group 200 obtains magnetic data, the data processing module 400 corrects the magnetic data to obtain the heading angle $\Phi$.

Specifically, if the magnetic sensor is free from any interference, the magnetic sensor collects magnetic data on a circle centered at (0, 0) when it is rotated by 360 degrees around its center. However, in practice, the magnetic sensor is affected by various ambient interferences, the magnetic field data will form a tilted eclipse that deviates from the origin. The data need to be corrected to obtain correction parameters. In the illustrated embodiment, each magnetic sensor of the magnetic sensor group 200 is firstly calibrated in an interference-free environment. The magnetic sensor group 200 is rotated by 360 degrees around its center while the magnetic data are collected. The interfered magnetic data form an eclipse with a formula of $(x-x_0)^2/a^2+(y-y_0)^2/b^2=R^2$, where x and y are magnetic data, R is a constant of the geomagnetic field, $x_0$, $y_0$, a and b are correction parameters. The above formula is rewritten in a matrix form, then a least square method is applied to obtain values of $x_0$, $y_0$, a and b. Each magnetic sensor is calibrated to obtain six sets of correction parameters, then the magnetic sensor group 200 is calibrated according to the six sets of correction parameters to obtain values of $x_0'$, $y_0'$, a' and b'. The magnetic data are corrected to form a circle centered at (0, 0) through calculation according to these parameters. The data processing module 400 obtains the heading angle $\Phi$ according to the corrected magnetic data.

The memory module 500 stores the coordinates of the point light source 300, the initial unit normal vectors of the sensing faces of the N optical sensors, as well as the parameters of the light intensity model in advance.

The data processing module 400 obtains the current unit normal vector of a sensing face of the first sensor 101, the second sensor 102, and the third sensor 103 according to the heading angle $\Phi$ and the initial unit normal vector. The data processing module 400 establishes a system of at least three equations according to the current unit normal vectors, the light intensity, the coordinates of the point light source 300 and the light intensity model, and solves the equations to obtain the coordinates of the optical sensor group 100, which represent the position of the circuit board.

Figure 3:
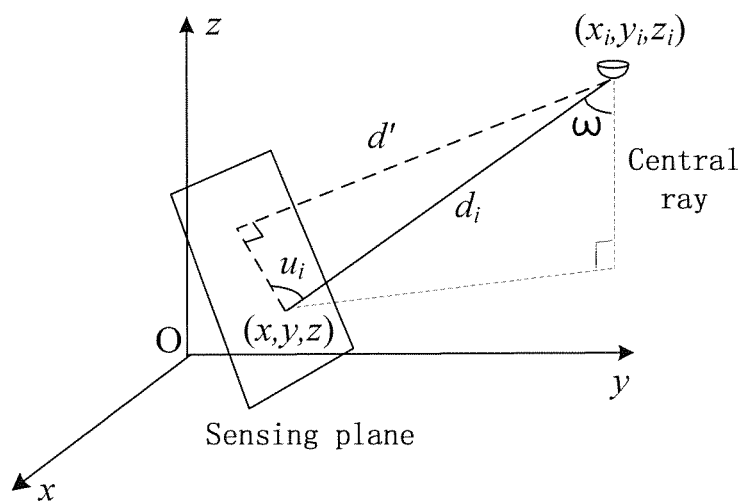
FIG. 3 illustrates a light field relation between an optical sensor and a point light source according to one embodiment.

The establishment of the equations is stated as follows. The equations are established according to the light intensity model $s_i=f_d(d)f_\mu(\mu_i)f_\omega(\omega)$. Referring to FIG. 3, for any one of the first sensor 101, the second sensor 102, and the third sensor 103, the distance between the point light source 300 and the optical sensor is $d=\sqrt{(x_0-x)^2+(y_0-y)^2+(z_0-z)^2}$, where $(x_0, y_0, z_0)$ are the coordinates of the point light source 300 and (x, y, z) are the coordinates of the optical sensor group 100. $f_d(d)$ is a function describing the relationship between light intensity and distance d, $f_\mu(\mu_i)$ and $f_\omega(\omega)$ are functions describing the relationships between light intensity and $\mu_i$, $\omega$ respectively. In addition, $\mu_i=\arcsin(|A_i(x_0-x)+B_i(y_0-y)+C_i(z_0-z)|/d)$, where $(A_i, B_i, C_i)$ is the current normal vector of the face of the $i^{th}$ optical sensor, and $\omega=\arccos((z_0-z)/d)$.

Specifically, $f_d(d)$, $f_\mu(\mu_i)$, $f\omega(\omega)$ are functions defined by light intensity and the distance d, the angle $\mu_i$, the angle $\omega$, respectively. Based on the light intensity model, a system of at least three equations is established among the first sensor 101, the second sensor 102, the third sensor 103, and the point light source 300.

The data processing module 400 obtains the current unit normal vector according to the heading $\Phi$ and the initial unit normal vector, and establishes a system of at least three equations, and solves it to obtain (x, y, z). In a preferred embodiment, the coordinates of the optical sensor group 100 are the coordinates of the gravity center of the base 110.

Preferably, the point light source 300 can be but not limited to a visible LED lamp, an infrared LED lamp, etc. It should be guaranteed that the optical sensor group 100 can collect the complete optical signal.

Preferably, the interference optical signals are removed before the data processing module 400 establishes the above system of equations. Specifically, the light intensity is sampled and Fourier transformed by the data processing module 400, thereby the interference optical signals in frequency domain (such as 100 Hz of the common fluorescent lamp and other frequencies of the indoor light) are removed.

Figure 4:
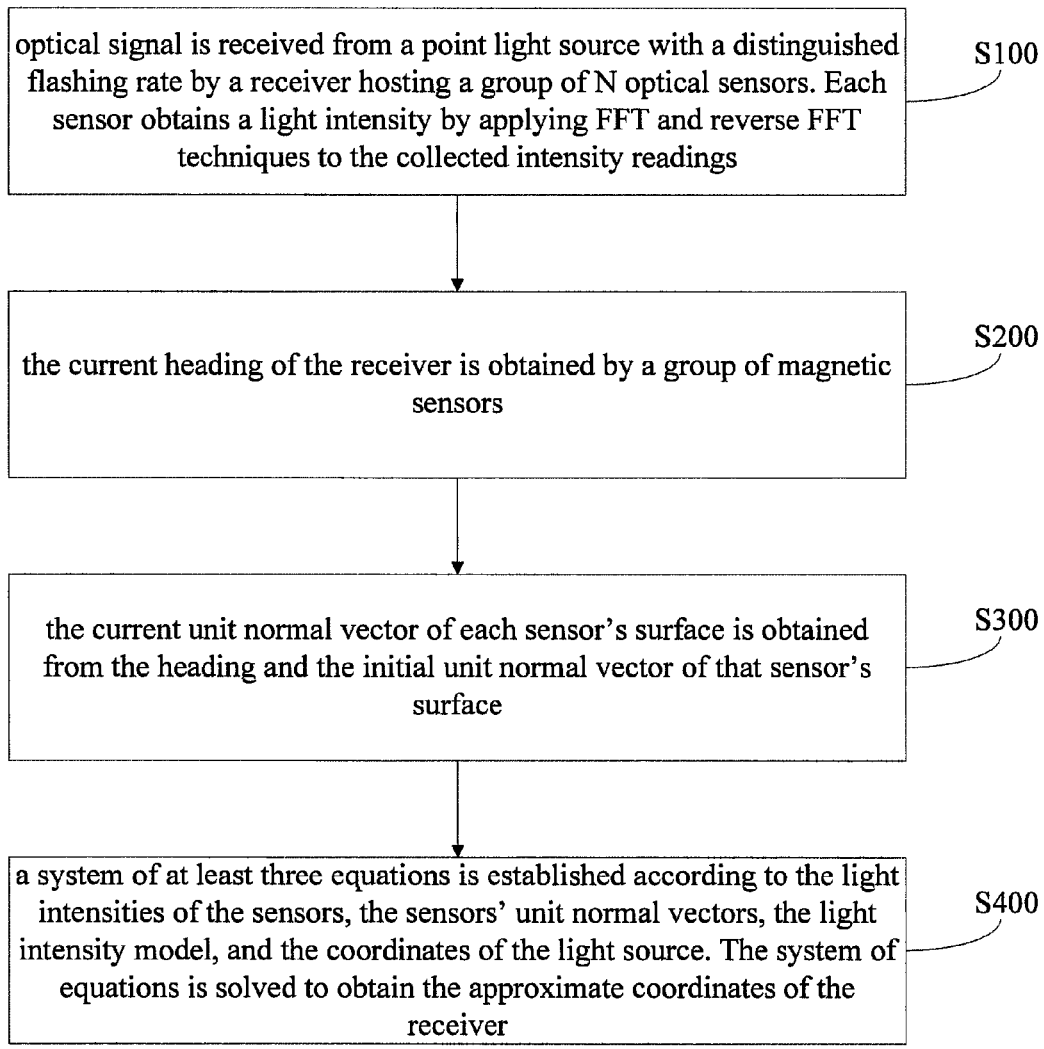
FIG. 4 is the flow chart of the multi-sensor indoor localization method based on light intensity according to one embodiment.

The disclosure further provides a multi-sensor indoor localization method based on light intensity. Referring to FIG. 4, the method includes: step S100, an optical signal is received from a point light source with a distinguished flashing rate by a receiver hosting a group of N optical sensors. Each sensor obtains a light intensity by applying FFT and reverse FFT techniques to the collected intensity readings. Step S200, the current heading of the receiver is obtained by a group of magnetic sensors. Step S300, the current unit normal vector of each sensor's surface is obtained from the heading and the initial unit normal vector of that sensor's surface. Step S400, a system of at least three equations is established according to the light intensities of the sensors, the sensors' unit normal vectors, the light intensity model, and the coordinates of the light source. The system of equations is solved to obtain the approximate coordinates of the receiver. The equations are established according to the light intensity model $s_i=f_d(d)f_\mu(\mu_i)f_\omega(\omega)$, where $s_i$ is the light intensity computed by the ith optical sensor, d is the Euclidean distance between $(x_0, y_0, z_0)$, the coordinates of the point light source, and $(x, y, z)$, the coordinates of the optical sensor group; $f_d(d)$ is a function describing the relationship between light intensity and distance d, $f_\mu(\mu_i)$ and $f_\omega(\omega)$ are functions describing the relationships between light intensity and $\mu_i$, $\omega$ respectively. In addition, $\mu_i=\arcsin(|A_i(x_0-x)+B_i(y_0-y)+C_i(z_0-z)|/d)$, where $(A_i, B_i, C_i)$ is the current normal vector of the face of the $i^{th}$ optical sensor, and $\omega=\arccos((z_0-z)/d)$.

The multi-sensor indoor localization method based on intensity is described in greater detail below.

The optical sensor group in step S100 includes a polyhedron-shaped base (shown in FIG. 2) and N optical sensors (i.e. the first sensor, the second sensor, the third sensor . . . ), where N≥6. The N optical sensors are located on the faces of the base, and the sensor group should satisfy the following conditions: when the optical sensor group is placed in a room, at least three optical sensors can receive the optical signals from the point light source. The optical sensor group can be disposed on a circuit board; the optical sensors and the data processing module are connected through data interfaces. The optical sensor group and the data processing module can be integrally on a circuit board which is part of the receiving device, which may be moved around with the user.

Taking N=6 as an example, referring to FIG. 2, the base has a shape of a five-sided prismoid, where the normal vectors of each three faces are linearly independent. According to the design mentioned above, at least three optical sensors (e.g. the first sensor, the second sensor, and the third sensor) of the optical sensor group can receive the optical signals from the point light source, and then the light intensity is obtained from the optical signals.

The current heading Φ is obtained by the magnetic sensor group in the step S200.

Preferably, the magnetic sensor group includes M magnetic sensors, the M magnetic sensors form a circle. In the illustrated embodiment, M=6, the magnetic sensor group obtains magnetic data, and the data processing module corrects the magnetic data to obtain the heading Φ.

Specifically, if the magnetic sensor's readings is free from any interference, the magnetic sensor's readings will form a circle centered at (0, 0) when it rotates 360 degrees around its center. However, in practice, interference often exists, and the readings will instead form a tilted eclipse that deviates from the origin. The data therefore need to be corrected. In the illustrated embodiment, each magnetic sensor of the magnetic sensor group is firstly calibrated in an environment free from external magnetic interference. The magnetic sensor group is rotated 360 degrees around its center while the magnetic data are being collected. The interfered magnetic data form an eclipse in the form $(x-x_0)^2/a^2+(y-y_0)^2/b^2=R^2$, where x and y are magnetic data, R is a constant of the geomagnetic field, $x_0$, $y_0$, a and b are correction parameters. A least square method is applied to obtain the values of $x_0$, $y_0$, a and b. Each magnetic sensor is first calibrated individually in an interference-free environment, and then the magnetic sensor group is calibrated jointly by treating the readings of the six sensors as the readings of a single sensor that undergoes a rotation, from which six readings are sampled. The correction parameters are used to adjust the current measurement of the heading Φ. With this information, the current unit normal vector can be calculated.

A system of at least three equations is established according to the current unit normal vectors, the light intensity, the coordinates of the point light source, and the light intensity model stored in advance. The system of equations is solved to obtain an approximate solution of minimum residual. The approximate solution is taken as the coordinates of the optical sensor group, i.e. the coordinates of the receiving device.

The establishment of the equations is stated as follows. The equations are established according to the light intensity model $s_i=f_d(d)f_\mu(\mu_i)f\omega(\omega)$. Referring to FIG. 3, for any one of the first sensor, the second sensor, and the third sensor, the distance between the point light source 300 and the optical sensor is $d=\sqrt{(x_0-x)^2+(y_0-y)^2+(z_0-z)^2}$, where $(x_0, y_0, z_0)$ are the coordinates of the point light source 300 and $(x, y, z)$ are the coordinates of the optical sensor group 100. $f_d(d)$ is a function describing the relationship between light intensity and distance d, $f_\mu(\mu_i)$ and $f_\omega(\omega)$ are functions describing the relationships between light intensity and $\mu_i$, $\omega$ respectively. In addition, $\mu_i=\arcsin(|A_i(x_0-x)+B_i(y_0-y)+C_i(z_0-z)|/d)$, where $(A_i, B_i, C_i)$ is the current normal vector of the face of the $i^{th}$ optical sensor, and $\omega=\arccos((z_0-z)/d)$.

Specifically, $f_d(d)$, $f_\mu(\mu_i)$, $f_\omega(\omega)$ are functions defined by light intensity and the distance d, the angle $\mu_i$, and the angle $\omega$, respectively. Since the attenuation of the light intensity is inversely proportional to the square of the distance, a parameter k is used to indicate the light intensity measured by an optical sensor that is located one meter away from the point light source 300 and whose face is perpendicular to the central ray of the point light source 300, thus $f_d(d)=k/d^2$. The function $f_\mu(\mu_i)$ can be established as follows: place an optical sensor at a certain distance from the light source with an initial incident angle $\mu_i=90°$, rotate the face of the optical sensor gradually with a step 10°, until $\mu_i=0°$, when the central ray of the point light source 300 is parallel to the face of the optical sensor; the measured light intensity readings for each $\mu_i$ are then fitted with a function $f_\mu(\mu_i)$. The light intensity is measured for various ω to obtain the function $f_\omega(\omega)$. Based on the light intensity model, a system of at least three equations is established among the first sensor 101, the second sensor 102, the third sensor 103, and the point light source 300. Based on the light intensity model, a system of at least three equations is established.

By solving the above system of equations, the value of (x, y, z) which are the coordinates of the optical sensor group is obtained. In a preferred embodiment, the coordinates of the optical sensor group are the coordinates of the gravity center of the base 110.

Preferably, the point light source can be but not limited to a visible LED lamp, an infrared LED lamp, etc. It should be guaranteed that the optical sensor group can collect the complete optical signal. Preferably, the frequency of the point light source is set to be 30 Hz to 400 Hz.

Preferably, the interference optical signals are removed before the above system of equations is established in step S400. Specifically, the light intensity is sampled and Fourier transformed, thereby filtering out the ambient light signals in the frequency domain (such as the 100 Hz signal of the common fluorescent lamps).

The multi-sensor indoor localization device according to the present disclosure receives optical signal and obtains the light intensity. It uses an experimental method using multiple optical sensors and a single light source to locate the receiving device in an indoor environment without the help of other high precision auxiliary equipment and indoor fingerprint collection. The method above has high localization precision, good stability and low cost.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. A multi-sensor indoor localization method, comprising:
receiving an optical signal from a point light source using an optical sensor group comprising N optical sensors;
obtaining a light intensity of the optical signal, wherein the optical sensor group comprises a polyhedron-shaped base where respective normal vectors of each three faces are linearly independent, the N optical sensors are located on the faces of the base, and N≥6;
obtaining a current heading by a magnetic sensor group;
obtaining a current unit normal vector according to a current heading angle and an initial unit normal vector of a sensing face of an optical sensor;
establishing a system of at least three equations according to current unit normal vectors, the light intensity, the coordinates of the point light source and a light intensity model;
solving the system of equations to obtain an approximate solution of minimum residual, the approximate solution is regarded as the coordinates of the optical sensor group,
wherein the equations are established according to the light intensity model $s_i=f_d(d)f_\mu(\mu_i)f_\omega(\omega)$, where $s_i$ is the light intensity computed by an $i^{th}$ optical sensor, d is the Euclidean distance between $(x_0, y_0, z_0)$, the coordinates of the point light source, and $(x, y, z)$, the coordinates of the optical sensor group; $f_d(d)$ is a function describing a relationship between light intensity and distance d, $f_\mu(\mu_i)$ and $f_\omega(\omega)$ are functions describing relationships between light intensity and angles $\mu_i$, $\omega$ respectively, in addition, $\mu_i=\arcsin(|A_i(x_0-x)+B_i(y_0-y)+C_i(z_0-z)|/d)$, where $(A_i, B_i, C_i)$ is a current normal vector of the face of the $i^{th}$ optical sensor, and $\omega=\arccos((z_0-z)/d)$.

2. The method according to claim 1, wherein $f_d(d)=k/d^2$, where k is the light intensity received by the optical sensor which is perpendicular to the central ray of the point source and 1 meter away from the point light source.

3. The method according to claim 1, wherein $f_\mu(\mu_i)$ is obtained as follows:
the optical sensor is placed on a central ray and d meters away from the point light source, with the initial incident angle $\mu_i$ set to 90°, collect the light intensity reading while rotating the sensing face of the optical sensor until the incident angle reduces to 0, the measured intensity data are fitted with the function $f_\mu(\mu_i)$.

4. The method according to claim 3, wherein as $\mu_i$ is fixed to 90°, and the angle $\omega$ increases from 0° to 90°, the light intensity is measured for each $\omega$, the intensity data are fitted with the function $f_\omega(\omega)$.

5. The method according to claim 1, wherein N=6, the base has a shape of a five-sided prismoid, the six optical sensors are located on the six faces of the base.

6. The method according to claim 5, wherein the coordinates of the optical sensor group are coordinates of the gravity center of the base.

7. The method according to claim 1, wherein the magnetic sensor group comprises M magnetic sensors, the M magnetic sensors are arranged to form a circle, so that the magnetic data are used to obtain correction parameters that are used to correct the heading of the receiver.

8. The method according to claim 1, wherein the point light source is a visible LED lamp or an infrared LED lamp.

9. The method according to claim 1, further comprising removing environmental interference from received optical signals, which is prior to the establishing of the system of equations according to the current unit normal vectors of the sensors, the light intensity, the coordinates of the point light source, and the light intensity model.

10. A multi-sensor indoor localization device, comprising:
an optical sensor group, a magnetic sensor group, a point light source, a data processing module, and a memory module;
wherein the optical sensor group comprises N optical sensors, where N≥6, the optical sensor group comprises a polyhedron-shaped base, where respective normal vectors of each three faces are linearly independent, the N optical sensors are located on faces of the base, at least three optical sensors are operable to receive an optical signal from the point light source in any indoor position;
the memory module is operable to store a coordinate of the point light source and initial unit normal vectors of sensing faces of the N optical sensors;
the magnetic sensor group is operable to obtain a current heading angle;
the data processing module is operable to obtain a light intensity according to the optical signal, and obtain a current unit normal vector according to a heading angle and the initial unit normal vector, and establish a system of at least three equations according to the current unit normal vectors, the light intensity, and the coordinates of the point light source, and solve for an approximate solution of minimum residual, the approximate solution is regarded as coordinates of the optical sensor group;
wherein the equations are established according to a light intensity model $s_i=f_d(d)f_\mu(\mu_i)f_\omega(\omega)$, where $s_i$ is the light intensity computed by the $i^{th}$ optical sensor, d is the Euclidean distance between $(x_0, y_0, z_0)$, the coordinates of the point light source, and $(x, y, z)$, the coordinates of the optical sensor group; $f_d(d)$ is a function describing the relationship between light intensity and distance d, $f_\mu(\mu_i)$ and $f_\omega(\omega)$ are functions describing the relationships between light intensity and angles $\mu_i$, $\omega$ respectively, in addition, $\mu_i=\arcsin(|A_i(x_0-x)+B_i(y_0-y)+C_i(z_0-z)|/d)$, where $(A_i, B_i, C_i)$ is the current normal vector of the face of the $i^{th}$ optical sensor, and $\omega=\arccos((z_0-z)/d)$.

* * * * *